US009562656B2

(12) United States Patent
Miyakawa et al.

(10) Patent No.: US 9,562,656 B2
(45) Date of Patent: Feb. 7, 2017

(54) ILLUMINATION DEVICE ATTACHABLE TO AND DETACHABLE FROM AN IMAGING APPARATUS

(71) Applicant: CANON KABUSHIKI KAISHA, Tokyo (JP)

(72) Inventors: Toshiki Miyakawa, Yokohama (JP); Yoshiharu Tenmyo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 14/616,077

(22) Filed: Feb. 6, 2015

(65) Prior Publication Data
US 2015/0227024 A1    Aug. 13, 2015

(30) Foreign Application Priority Data
Feb. 10, 2014    (JP) .................................. 2014-023826

(51) Int. Cl.
*G03B 15/02*    (2006.01)
*F21L 4/02*    (2006.01)
*F21V 33/00*    (2006.01)
*G03B 15/05*    (2006.01)
*F21W 131/30*    (2006.01)

(52) U.S. Cl.
CPC .............. *F21L 4/02* (2013.01); *F21V 33/0052* (2013.01); *G03B 15/05* (2013.01); *F21W 2131/30* (2013.01)

(58) Field of Classification Search
CPC . F21V 33/0052; F21W 2131/30; G03B 15/02; G03B 15/03; G03B 15/035; G03B 15/05
USPC 315/200 A, 241 R, 241 P, 242, 243; 353/43, 85
See application file for complete search history.

(56) References Cited

U.S. PATENT DOCUMENTS

| 4,082,984 A | * | 4/1978 | Iwata | H01F 30/10 315/241 P |
| 4,242,616 A | * | 12/1980 | Takematsu | H05B 41/325 315/151 |
| 4,561,751 A | * | 12/1985 | Hagyuda | G03B 15/05 396/171 |
| 4,816,854 A | * | 3/1989 | Tsuji | G03B 15/05 315/241 P |
| 5,287,134 A | * | 2/1994 | Cocca | G03B 7/16 396/203 |

(Continued)

FOREIGN PATENT DOCUMENTS

JP    2001-215574 A    8/2001

*Primary Examiner* — Peggy Neils
*Assistant Examiner* — Alexander Garlen
(74) *Attorney, Agent, or Firm* — Canon U.S.A Inc., IP Division (57) ABSTRACT

There is provided an illumination device that is prevented from being increased in size. The illumination device includes a first light source, a second light source, a main capacitor configured to store electric charge for causing the first light source and the second light source to emit light, a first coil electrically connected between the first light source and the main capacitor, and a second coil electrically connected between the second light source and the main capacitor. A radial direction of the first coil and a radial direction of the second coil are parallel to a vertical direction of the illumination device, the first coil and the second coil are aligned with the main capacitor in a horizontal direction of the illumination device, and the first coil is aligned with the second coil in a direction orthogonal to the horizontal direction of the illumination device.

12 Claims, 5 Drawing Sheets

(56) References Cited

U.S. PATENT DOCUMENTS 5,717,964 A * 2/1998 Dowe ................... G03B 7/16
396/165

* cited by examiner

ILLUMINATION DEVICE ATTACHABLE TO AND DETACHABLE FROM AN IMAGING APPARATUS

BACKGROUND OF THE INVENTION

Field of the Invention

The present invention relates to an illumination device attachable to and detachable from an imaging apparatus.

Description of the Related Art

An illumination device including a ring-shaped or a circular arc-shaped light emitting unit extending along an outer circumference of a leading end of an imaging lens (i.e., imaging lens barrel) is commonly used in a macro image capturing in which an object image is captured at a close distance. Japanese Patent Application Laid-Open No. 2001-215574 discusses an illumination device including a ring-shaped light emitting unit configured of a plurality of light sources such as circular arc-shaped xenon tubes disposed along the outer circumference of an imaging lens.

In recent years, with the size reduction of a camera main body, there has been an increasing demand for of the size reduction of the illumination device attached to the camera. With respect to the illumination device configured of a power source unit and the light emitting unit provided separately as discussed in Japanese Patent Application Laid-Open No. 2001-215574, it is desirable that the size of the power source unit be reduced in order to be attached to the camera without a feeling of strangeness.

SUMMARY OF THE INVENTION

The present invention is directed to an illumination device that can be reduced in size.

According to an aspect of the present invention, an illumination device attachable to and detachable from an imaging apparatus, includes a first light source, a second light source, a main capacitor configured to store electric charge for causing the first light source and the second light source to emit light, a first coil electrically connected between the first light source and the main capacitor, and a second coil electrically connected between the second light source and the main capacitor, wherein a radial direction of the first coil and a radial direction of the second coil are parallel to a vertical direction of the illumination device, wherein the first coil and the second coil are aligned with the main capacitor in a horizontal direction of the illumination device, wherein the first coil is aligned with the second coil in a direction orthogonal to the horizontal direction of the illumination device.

Further features of the present invention will become apparent from the following description of exemplary embodiments with reference to the attached drawings.

DESCRIPTION OF THE EMBODIMENTS

Hereinafter, an exemplary embodiment of the present invention will be described in detail with reference to the appended drawings.

Figure 1:
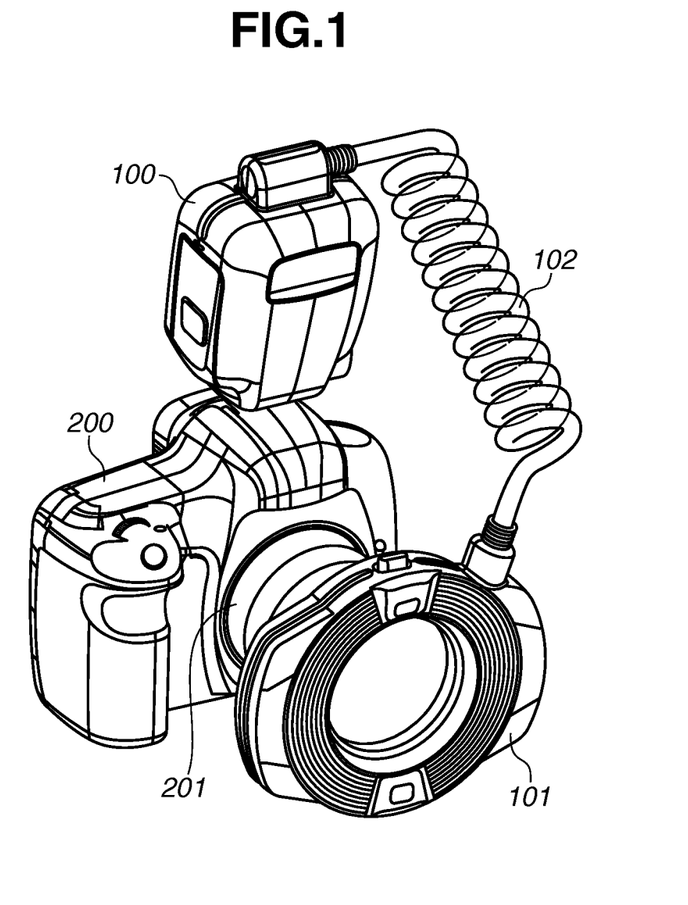
FIG. 1 is a perspective view of an overall configuration illustrating a state where an illumination device according to an exemplary embodiment of the present invention is attached to an imaging apparatus.

FIG. 1 illustrates a camera system including a flash device serving as an illumination device according to an exemplary embodiment of the present invention and a camera 200 as an imaging apparatus and an imaging lens 201. The flash device includes a control unit 100 and a flash unit 101 provided separately, and a connection code 102 connects the control unit 100 and the flash unit 101. As illustrated in FIG. 1, the control unit 100 is detachably attached to an accessory shoe of the camera 200, and the flash unit 101 is detachably attached to the imaging lens 201 (i.e., imaging lens barrel) so as to surround the outer circumference of the imaging lens 201. In addition, the imaging lens 201 may be integrally provided on the camera 200, or may be an interchangeable lens detachably attached to the camera 200. Further, as long as the flash unit 101 can be attached to surround the outer circumference of the imaging lens 201, the flash unit 101 may be detachably attached to the camera 200 instead of the imaging lens 201.

Although description will be given below in detail, the flash unit 101 includes two light sources for emitting illumination light for executing macro image capturing and an illumination optical system for emitting the light from the two light sources toward a field of view (i.e., object).

As illustrated in FIG. 1, the flash unit 101 may be attached to the imaging lens 201 in such a manner that the two light sources built in the portions projected in a radial direction of the ring-shaped portions are disposed symmetrically, or may be attached thereto in such a manner that the two light sources are disposed on the positions shifted in the circumferential direction of the imaging lens 201 from those positions. In addition, a user can intentionally create a shaded portion or chose a side darkened by shadow by optionally selecting only one light source from the two light sources to emit light.

For example, the emission control of the illumination light in the flash unit 101 can be executed as follows.

First, a preliminary light emitting operation for continuously irradiating an object with a predetermined amount of light during a certain period of time is executed immediately before executing actual image capturing, to measure luminance distribution of the object using a light metering sensor disposed in the camera 200. Then, an amount of light to be emitted at a main light emitting operation for the actual image capturing is determined in advance by using a predetermined algorithm based on the measured luminance distribution. Through the light emitting control in combination with a so-called multi-division metering, more accurate light modulation can be performed according to the condition of the object, and thus the user can execute the light modulation particularly suitable for the macro image capturing in which an object image is susceptible to the influence of an error in the amount of light emission.

Figure 2:
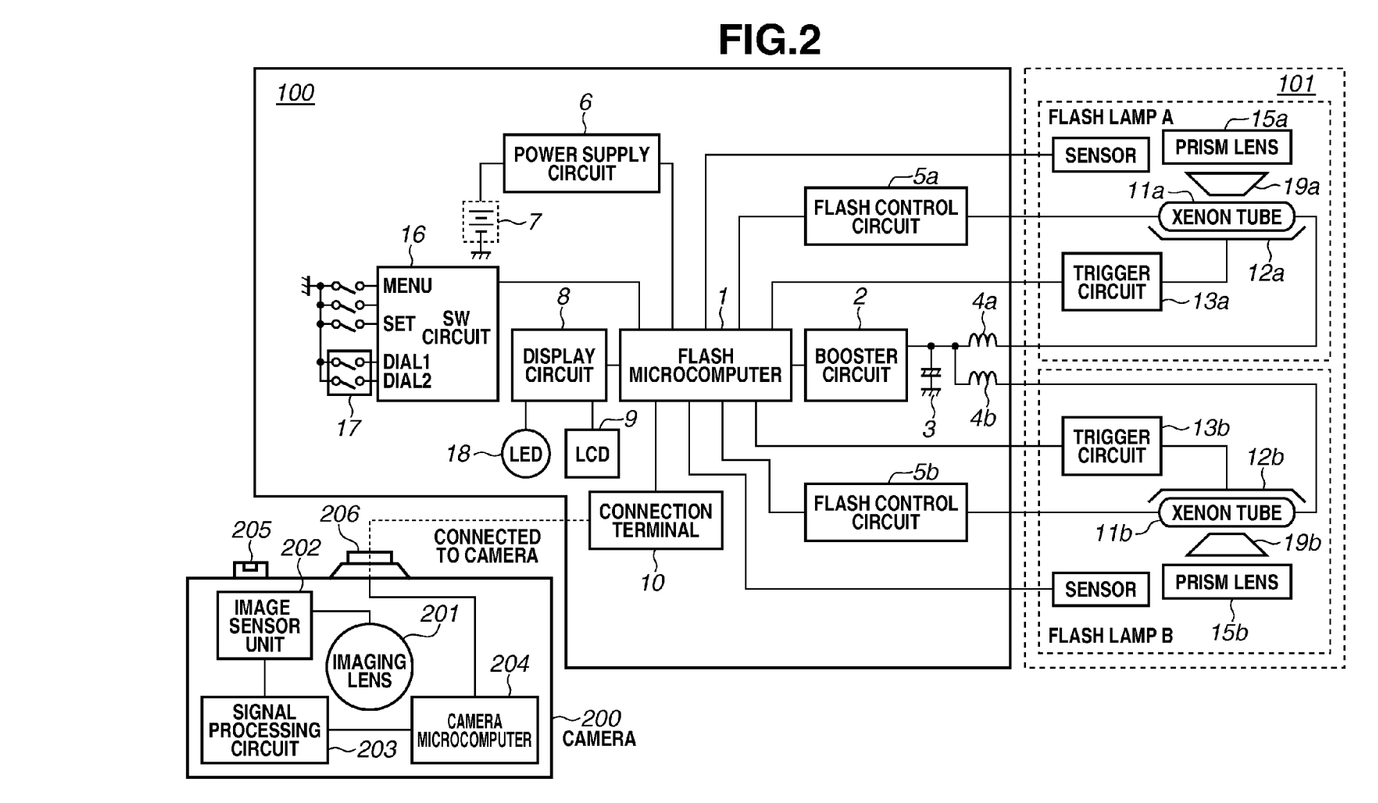
FIG. 2 is a block diagram illustrating a schematic configuration of a camera system according to the exemplary embodiment of the present invention.

FIG. 2 is a block diagram illustrating a configuration of a camera system according to the present exemplary embodiment.

First, a configuration of the camera 200 will be described. A microcomputer (hereinafter, referred to as "camera microcomputer") 204 controls respective units of the camera 200. An image sensor unit 202 is a charge coupled device (CCD) sensor or a complementary metal oxide semiconductor (CMOS) sensor including an infrared cut filter or a low-pass filter (not illustrated), and an object image is formed thereon through the imaging lens 201. A signal processing circuit 203 processes a signal from the image sensor unit 202.

A release switch 205 is a two-stage switch. When the camera microcomputer 204 detects that the release switch 205 is pressed up to a first stage, the camera microcomputer 204 causes the camera 200 to enter an image capturing stand-ready state to adjust a focus by driving the imaging lens 201, and execute light metering to calculate an exposure amount. A flash connection terminal 206 is disposed on the accessory shoe and connected to a connection terminal 10 provided on the flash device. Description of the other units such as a power source, an operation unit, and a memory will be omitted.

Next, a configuration of the flash device will be described. The flash unit 101 includes two light sources, flash lamps A and B. Hereinafter, a direction in which the control unit 100 stands towards is defined as a direction of the flash device. For example, a vertical direction of the control unit 100 is defined as a vertical direction of the flash device. Further, a direction orthogonal to an imaging optical axis of the camera 200 to which the flash device is attached is defined as a horizontal (right and left) direction of the flash device.

When a battery 7 is loaded, the control unit 100 activates a power supply circuit 6 to supply power to a microcomputer (hereinafter, referred to as "flash microcomputer") 1.

The flash microcomputer 1 includes a central processing unit (CPU), a read only memory (ROM), and a random access memory (RAM), and controls the entire control unit 100. When the user presses a MENU switch connected to a switch (SW) circuit 16, the flash microcomputer 1 controls a display circuit 8 to display a parameter setting mode on a liquid crystal display (LCD) 9. When the user operates a dial unit 17 or a SET switch, the flash microcomputer 1 sets a parameter necessary for controlling the control unit 100. The dial unit 17 has two sections, i.e., DIAL 1 and DIAL 2, which output different forms of pulses according to a rotational direction thereof, so that the flash microcomputer 1 can smoothly change the parameter by acquiring the rotational direction and the number of rotations.

When the user turns on the power source through a power switch connected to the SW circuit 16, a booster circuit 2 is activated to boost the voltage of the batteries 7 to several hundred volts, so that a main capacitor 3 is charged with energy (electric charge) to be used for light emission.

When the main capacitor 3 has been fully charged, the display circuit 8 turns on a light-emitting diode (LED) 18. Xenon tubes 11a and 11b function as light sources. By exciting the energy stored in the main capacitor 3 in response to reception of pulse voltages of several hundred kilovolts applied from trigger circuits 13a and 13b, the xenon tubes 11a and 11b emit light to irradiate the object therewith.

Ends of coils 4a and 4b are connected to a positive electrode of the main capacitor 3 while the other ends thereof are respectively connected to positive electrodes of the xenon tubes 11a and 11b. In other words, the coils 4a and 4b are electrically connected to corresponding light sources and the main capacitor 3.

The light emitted from the xenon tubes 11a and 11b is reflected by reflectors 12a and 12b, further reflected by circular arc reflection members 19a and 19b in an arc-like state, and emitted to the object while the light flux thereof is controlled by prism lenses 15a and 15b.

The connection terminal 10 is a terminal to connect the control unit 100 and the camera 200. The connection terminal 10 is provided on the lower side of the control unit 100 so as to be connected to the flash connection terminal 206 provided on the accessory shoe of the camera 200. With this configuration, the control unit 100 and the camera 200 can communicate with each other.

Figure 3A:
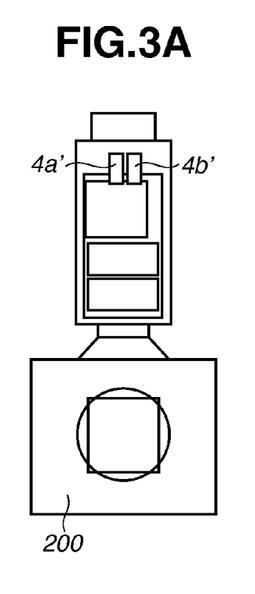
FIGS. 3A, 3B, and 3C are schematic diagrams illustrating a relationship between a component layout in a control unit of the illumination device and magnetic fields generated therefrom.
Figure 3B:
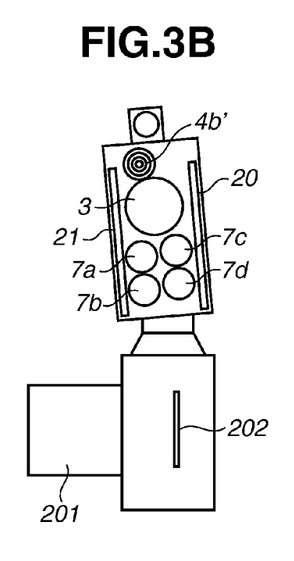
Figure 3C:
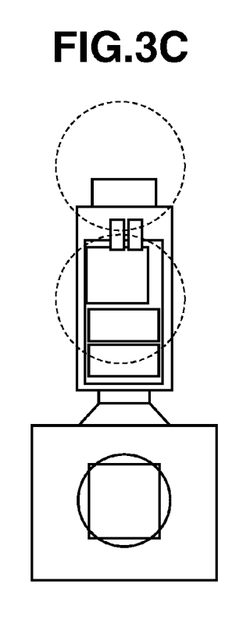

FIGS. 3A, 3B, and 3C are schematic diagrams illustrating a relationship between component layout in the control unit of the illumination device and magnetic fields generated therefrom. The control unit includes coils 4a', 4b', a main capacitor 3, battery storage units 7a to 7d for storing batteries 7, a control unit substrate 20 on which various electronic components are mounted, and a high-voltage substrate 21. Although the illumination device illustrated in FIGS. 3A to 3C is different from the illumination device according to the present exemplary embodiment, the same reference numerals are applied to the components common to those included in the illumination device according to the present exemplary embodiment. FIG. 3A is a front view seen from the object, FIG. 3B is a side view, and FIG. 3C is a schematic view illustrating magnetic fields generated by the coils 4a' and 4b'. Each of the magnetic fields is indicated by a dotted line passing through a center of the coil 4a' or 4b'. In addition, in FIGS. 3A, 3B, and 3C, the imaging apparatus to which the flash device is attached is supposed to be the above-described camera 200.

The battery storage units 7a to 7d, the main capacitor 3, and the coil 4a' (4b') are disposed to be stacked vertically when the control unit is viewed from the front side (object side). The battery storage units 7a to 7d are disposed so that the longitudinal directions thereof are parallel to the horizontal direction of the control unit. The main capacitor 3 having a substantially cylindrical shape is disposed so that the longitudinal direction (axis direction) thereof is parallel to the horizontal direction of the control unit. Further, when the control unit is viewed from the side face, the batteries 7, the main capacitor 3, and the coils 4a' and 4b' are disposed between the control unit substrate 20 on which various electronic control components such as a flash microcomputer are mounted and the high-voltage substrate 21 on which power components such as the coils 4a' and 4b', and an insulated gate bipolar transistor (IGBT) are mounted. Furthermore, the coils 4a' and 4b' are disposed on the upper side of the main capacitor 3, so that the radial directions of the coils 4a' and 4b' are parallel to the radial direction of the main capacitor 3.

When an electric current flows through the coils 4a' and 4b', magnetic field noise caused by the characteristics of the coils 4a' and 4b' is generated and may enter the image sensor unit 202 of the camera 200. As a result, a stripe-like noise may appear on the captured image. In the layout illustrated in FIG. 3C, orientation of the magnetic fields generated from the coils 4a' and 4b' are parallel to an imaging plane of the image sensor unit 202. When the magnetic fields and the imaging plane of the image sensor unit 202 are parallel to each other, the image sensor unit 202 is less influenced by the noise received therefrom. However, as illustrated in FIGS. 3A to 3C, if the coils 4a' and 4b' are disposed on the upper side of the main capacitor 3 in the orientation of the magnetic field in which the image sensor unit 202 is less influenced by the generated magnetic field noise, a size of the control unit in the vertical direction is increased.

Figure 4A:
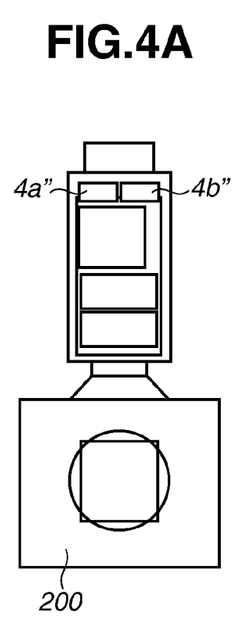
FIGS. 4A, 4B, and 4C are schematic diagrams illustrating a relationship between a component layout in a control unit of the illumination device and magnetic fields generated therefrom.
Figure 4B:
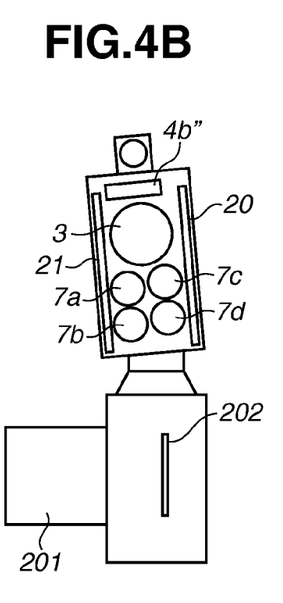
Figure 4C:
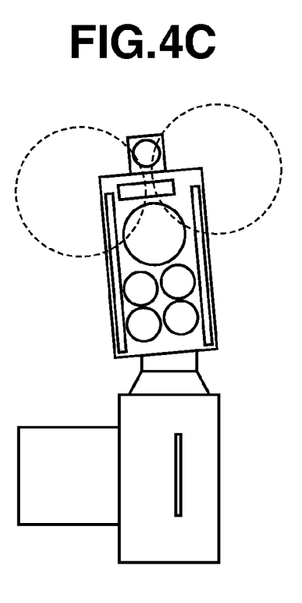

FIGS. 4A, 4B, and 4C are schematic diagrams illustrating a relationship between a component layout in the control unit of the illumination device and magnetic fields generated therefrom. In comparison to the component layout illustrated in FIGS. 3A to 3C, the relationship between the component layout and the magnetic fields generated therefrom illustrated in FIGS. 4A to 4C can reduce a size of the control unit in the vertical direction. Although the illumination device illustrated in FIGS. 4A to 4C is different from the illumination device according to the present exemplary embodiment, the same reference numerals are applied to the components common to those included in the illumination device according to the present exemplary embodiment. FIG. 4A is a front view seen from the object, FIG. 4B is a side view, and FIG. 4C is a schematic view illustrating the magnetic fields generated from the coils 4a" and 4b". In addition, in FIGS. 4A, 4B, and 4C, the imaging apparatus to which the flash device is attached is supposed to be the above-described camera 200.

In FIGS. 4A, 4B, and 4C, different from the component layout illustrated in FIGS. 3A, 3B, and 3C, the coils 4a" and 4b" are disposed on the upper side of the main capacitor 3 so that the radial directions of the coils 4a" and 4b" are orthogonal to the radial direction of the main capacitor 3. With such a layout, the length of the control unit in the vertical direction can be reduced according to a difference in length in the radial direction and length in the thickness direction of the coils 4a" and 4b" in comparison to the component layout illustrated in FIGS. 3A, 3B, and 3C. However, as illustrated in FIG. 4C, the magnetic fields generated from the coils 4a" and 4b" are orthogonal to the imaging plane of the image sensor unit 202, so as to penetrate the imaging plane. If the magnetic fields penetrate the imaging plane of the image sensor unit 202 as described above, the image sensor unit 202 is considerably influenced by the magnetic field noise. As a result, there arises a problem in which a stripe-like noise appears on the captured image.

Figure 5A:
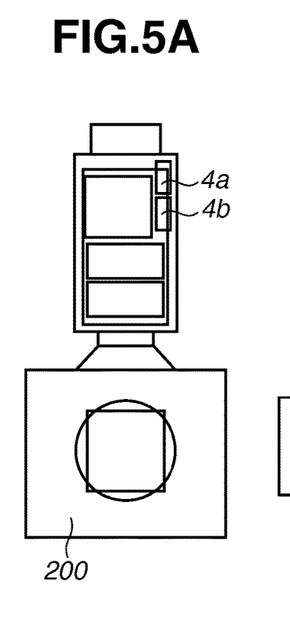
FIGS. 5A, 5B, and 5C are schematic diagrams illustrating a relationship between a component layout in a control unit of the illumination device and magnetic fields generated therefrom.
Figures 5B, 5C:
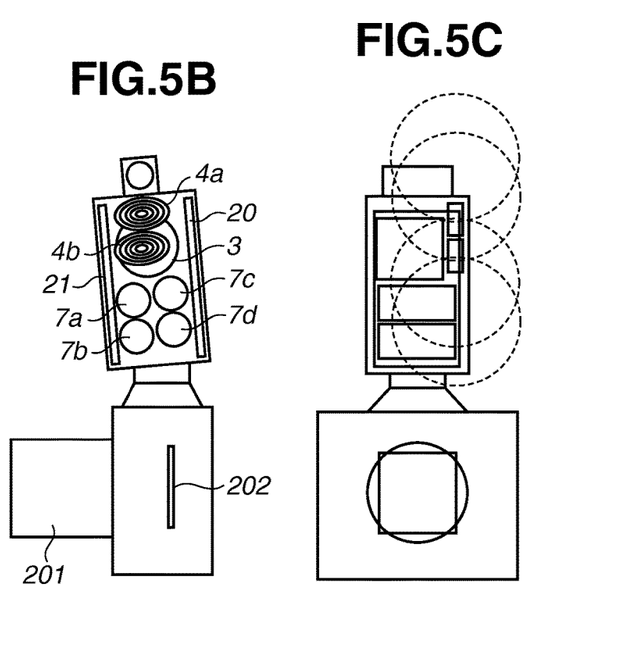

FIGS. 5A, 5B, and 5C are schematic diagrams illustrating a relationship between the component layout in the control unit 100 of the flash device serving as the illumination device according to the present exemplary embodiment and magnetic fields generated therein. FIG. 5A is a front view seen from the object, FIG. 5B is a side view, and FIG. 5C is a schematic view illustrating the magnetic fields generated from the coils 4a and 4b. In FIGS. 5A, 5B, and 5C, the imaging apparatus to which the flash device is attached is supposed to be the above-described camera 200.

As illustrated in FIG. 5A, the coils 4a and 4b are vertically disposed on the side of the main capacitor 3 so that the radial directions of the coils 4a and 4b are parallel to the radial direction of the main capacitor 3. With such a layout, the size of the control unit 100 in the vertical direction can be prevented from being increased in comparison to the configuration in which the coils 4a and 4b are disposed on the upper side of the main capacitor 3.

Further, as illustrated in FIG. 5B, the coils 4a and 4b are formed into elliptical shapes the minor axes of which correspond to the vertical direction of the flash device, and thus the length of the coil 4a projected from the upper face of the main capacitor 3 can be reduced while securing the sufficient capacity.

Furthermore, because the length of the main capacitor 3 in the longitudinal direction is shorter than that of the battery storage units 7a to 7d, an empty space created from a difference in length between the main capacitor 3 and the battery storage units 7a to 7d is utilized to dispose the coils 4a and 4b. More specifically, the coils 4a and 4b are disposed so as to be aligned with the battery storage units 7a to 7d in the vertical direction of the control unit 100, while being aligned with the main capacitor 3 in the horizontal direction of the control unit 100. Here, the lateral directions of the battery storage units 7a to 7d, the radial direction of the main capacitor 3, and the radial directions of the coils 4a and 4b correspond to the vertical direction of the control unit 100. Further, the longitudinal directions of the battery storage units 7a to 7d, the longitudinal direction of the main capacitor 3, and the axis directions of the coils 4a and 4b correspond to the horizontal direction of the control unit 100. With such a layout, the size of the control unit 100 in the horizontal direction can be prevented from being increased.

Further, the coils 4a and 4b are arranged in the vertical direction of the control unit 100 instead of being arranged in the horizontal direction of the control unit 100, so that one coil can be prevented from being influenced by the magnetic field noise generated in another coil. In addition, if the control unit substrate 20 and the high-voltage substrate 21 are arranged with a space therebetween, the coils 4a and 4b may be disposed on the side of the main capacitor 3 back and forth with each other so that the radial directions of the coils 4a and 4b are parallel to the radial direction of the main capacitor 3. In other words, the coils 4a and 4b are aligned vertically or back and forth with each other as long as the coils 4a and 4b are disposed so as to be aligned with each other in a direction orthogonal to the horizontal direction of the control unit 100.

Further, as illustrated in FIG. 5C, the imaging plane of the image sensor unit 202 and the orientation of the magnetic fields are parallel to each other, and thus the image sensor unit 202 is less influenced by the magnetic field noise.

With such a layout, the illumination device can be prevented from being increased in size while the image sensor unit 202 can be prevented from being influenced by the magnetic field noise generated from the coils included in the control unit 100.

In the present exemplary embodiment, the illumination device having two light sources has been described as an example. However, the present invention is also applicable to an illumination device having three or more light sources. Further, the shape of the flash unit is not limited to a ring-shape.

Furthermore, in the present exemplary embodiment, the illumination device in which the control unit and the flash unit are connected to each other with the connection code has been described as an example. However, the present invention is also applicable to an illumination device in which a control unit and a flash unit are configured integrally.

In addition, the light source other than the xenon tube may be employed as long as the illumination device is provided with a light source that emits light by using the energy stored in the main capacitor.

The preferred exemplary embodiment of the present invention has been described as the above. However, the present invention is not limited to the above exemplary embodiment, and many variations and modifications are possible within the scope of the present invention.

According to the aspect of the present invention, the illumination device can be prevented from being increased in size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-023826 filed Feb. 10, 2014, which is hereby incorporated by reference herein in its entirety.

What is claimed is:

1. An illumination device attachable to and detachable from an imaging apparatus, the illumination device comprising:
   a first light source;
   a second light source;
   a main capacitor configured to store electric charge for causing the first light source and the second light source to emit light;
   a first coil electrically connected between the first light source and the main capacitor; and
   a second coil electrically connected between the second light source and the main capacitor,
   wherein a radial direction of the first coil and a radial direction of the second coil are parallel to a vertical direction of the illumination device,
   wherein the first coil and the second coil are aligned with the main capacitor in a horizontal direction of the illumination device,
   wherein the horizontal direction of the illumination device is orthogonal to an imaging optical axis of an imaging apparatus to which the illumination device is attached, and
   wherein the first coil is aligned with the second coil in a direction orthogonal to the horizontal direction of the illumination device.

2. The illumination device according to claim 1, further comprising a battery storage unit configured to store a battery,
   wherein the first coil and the second coil are disposed so as to be aligned with the battery storage unit in a lateral direction of the battery storage unit.

3. The illumination device according to claim 2, wherein the battery storage unit is aligned with the main capacitor in the lateral direction of the battery storage unit.

4. The illumination device according to claim 2, wherein a length of the main capacitor in a longitudinal direction of the main capacitor is shorter than a length of the battery storage unit in a longitudinal direction of the battery storage unit.

5. The illumination device according to claim 1, further comprising a connection terminal to be connected to an imaging apparatus,
   wherein the connection terminal is disposed on a lower side of the illumination device.

6. The illumination device according to claim 1, wherein the first coil and the second coil are disposed on an upper side of the main capacitor.

7. The illumination device according to claim 1, wherein the first coil is aligned with the second coil in a vertical direction of the illumination device.

8. The illumination device according to claim 7, wherein the first coil and the second coil have elliptical shapes minor axes of which correspond to the vertical direction of the illumination device.

9. The illumination device according to claim 1, wherein the first coil and the second coil have elliptical shapes.

10. The illumination device according to claim 1, further comprising:
    a first substrate on which electronic control components are mounted; and
    a second substrate on which high-voltage electronic components are mounted,
    wherein the first coil and the second coil are disposed between the first substrate and the second substrate.

11. The illumination device according to claim 1, further comprising:
    a flash unit including the first light source and the second light source;
    a control unit including the main capacitor, the first coil, and the second coil; and
    a connection code connecting the flash unit and the control unit.

12. An illumination device attachable to and detachable from an imaging apparatus, the illumination device comprising:
    a first light source;
    a second light source;
    a main capacitor configured to store electric charge for causing the first light source and the second light source to emit light;
    a first coil electrically connected between the first light source and the main capacitor; and
    a second coil electrically connected between the second light source and the main capacitor,
    wherein a radial direction of the first coil and a radial direction of the second coil are parallel to a radial direction of the main capacitor,
    wherein the first coil and the second coil are aligned with the main capacitor in an axis direction of the main capacitor,
    wherein the axis direction of the main capacitor is not parallel to a vertical direction of the illumination device and is orthogonal to an imaging optical axis of an imaging apparatus to which the illumination device is attached, and
    wherein the first coil is aligned with the second coil in the radial direction of the main capacitor.

* * * * *